United States Patent [19]
Hoffman

[11] 3,832,091
[45] Aug. 27, 1974

[54] FAN HUB AND SHAFT ASSEMBLY

[75] Inventor: Joseph H. Hoffman, Norwood, Mass.

[73] Assignee: Westinghouse Electric Corporation, Pittsburgh, Pa.

[22] Filed: Sept. 27, 1973

[21] Appl. No.: 401,523

[52] U.S. Cl.................. 416/184, 416/214, 416/244
[51] Int. Cl............................................ F04d 17/08
[58] Field of Search ....... 416/244, 244 A, 184, 186, 416/214, 214 A, 224

[56] References Cited
UNITED STATES PATENTS

| 905,487 | 12/1908 | Worsey | 416/214 |
|---|---|---|---|
| 1,026,821 | 5/1912 | Muller | 416/244 |
| 1,362,074 | 12/1920 | Baumann | 416/214 |
| 1,669,797 | 5/1928 | Wiberg | 416/244 X |
| 1,684,773 | 9/1928 | Marks | 416/184 |
| 1,884,252 | 10/1932 | Robinson | 416/244 |
| 1,959,220 | 5/1934 | Robinson | 416/244 |
| 2,065,716 | 12/1936 | Leonard | 416/184 |

FOREIGN PATENTS OR APPLICATIONS

| 891,739 | 3/1962 | Great Britain | 416/244 |
|---|---|---|---|

Primary Examiner—Everetté A. Powell, Jr.
Attorney, Agent, or Firm—F. Blake

[57] ABSTRACT

An apertured fan disc, hub and shaft assembly including a split ring located within a recess on the shaft, a principal hub shrunk onto the ring to secure the ring and the hub to the shaft, and the fan disc secured to the principal hub. If desired, a secondary hub complementary to the principal hub may be mounted on the shaft with the fan disc secured thereto between both the principal hub and the secondary hub. Also, the disc may be provided with a boss on the periphery of its aperture to be secured between the hubs.

5 Claims, 2 Drawing Figures

FAN HUB AND SHAFT ASSEMBLY

BACKGROUND OF THE INVENTION

For the manufacturer of large-scale fan disc and shaft apparatus, one decision to be made is between the relative economical advantages of factory assembly versus field assembly. Factory assembly permits the economic utilization of materials and the manufacturing techniques while field assembly reduces the shipping costs.

Clearly, what is needed for very large fan constructions is a simple fan disc, hub and shaft arrangement, parts of which can be manufactured and assembled under factory supervision, yet enabling easy assembly of the entire fan in the field.

Past designs have included "milled keys and keyways" and a variety of other arrangements for securing a fan to a shaft. However, these solutions may be both costly in the factory and difficult to achieve in the field. Milling adds to manufacturing costs, while fitting a massive and unwieldy disc of large dimensions in the field is impracticable.

PRIOR ART

The Scott U.S. Pat. No. 861,143 and the Anderson U.S. Pat. No. 3,165,342 both show wheel and shaft assemblies although neither patent discloses a fan disc, hub and shaft apparatus wherein the shrink-fit of a hub onto a split ring within a recess of a shaft with the fan disc being secured to the hub, serves to secure the disc both angularly and axially to the shaft. Moreover, the split ring within the shaft recess disclosed by the Scott patent, since it is not a shrink-fit, merely serves to retain the wheel against a flange on the shaft, thus preventing only axial movement, but not securing against angular or rotary movement which must be prevented by the use of the key as shown.

SUMMARY OF THE INVENTION

An object of this invention, therefore, is to provide a fan disc and shaft apparatus which can be manufactured in the factory, shipped to the desired location, and easily assembled on-site by unskilled workers. In addition, the fan unit may be easily disassembled to replace the fan disc for reassembly.

Another object of this invention is to provide a fan disc and shaft apparatus which does not require a milled key and keyway to transmit angular or rotary motion from the shaft to the fan disc.

According to the invention a fan shaft is provided with a recess that is machined about the circumference of the shaft. A segmental ring, the dimensions of which are selected to match the dimensions of the recess, is fitted to engage the surfaces of the recess to prevent axial movement of the ring relative to the shaft after assembly. An apertured principal hub is mounted on the shaft, the dimensions of the aperture being selected to enable the hub to be slipped over the shaft and ring when heated to press against and bind the periphery of the ring when cooled such that a shrink-fit is formed by the hub over the ring, thus forming a shrink-fit between the ring and the shaft within the recess, thereby securing the hub to the shaft against both angular and axial displacements. The disc may thereafter be secured to the principal hub by any conventional means. If desired, a secondary hub may be mounted on the shaft with the fan disc secured between the principal hub and the secondary hub by any conventional means.

In the preferred form of this invention, an annular boss is formed upon the periphery of the aperture of the fan disc and both the principal hub and the secondary hub are provided with recessed surfaces complementary to the annular boss to engage and retain the boss of the fan disc and thus secure the fan disc with the hubs.

DESCRIPTION OF THE PREFERRED EMBODIMENT

Figure 1:
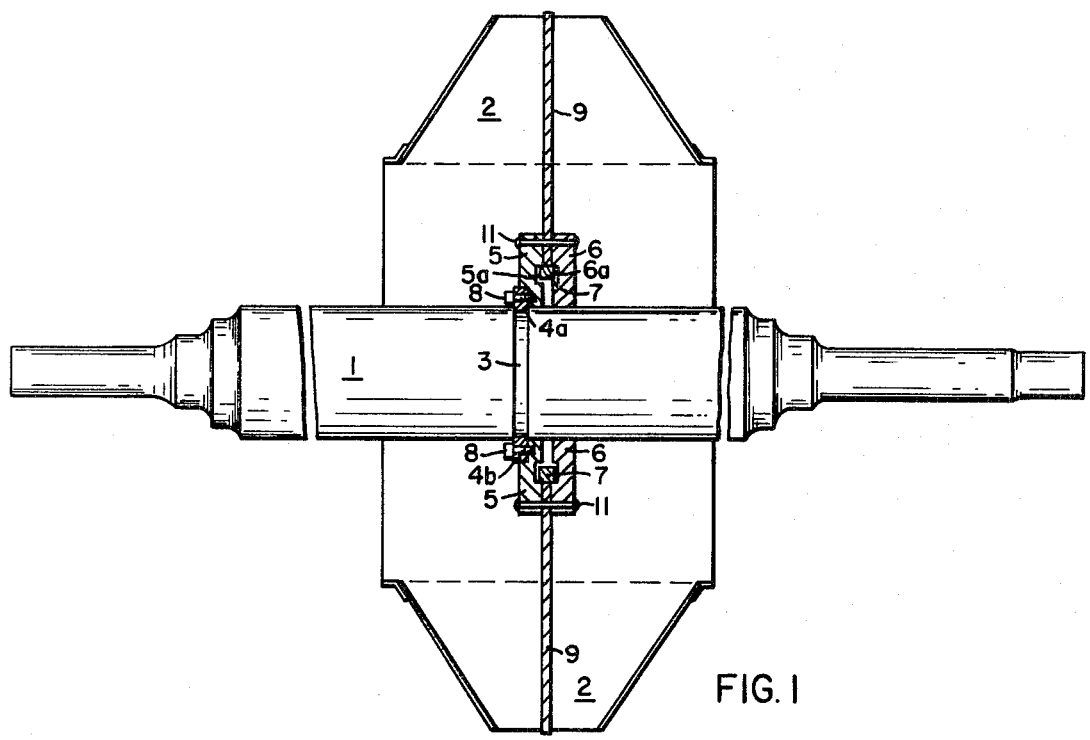
FIG. 1 is a side view of the invention partly in section including an apertured fan disc and shaft assembly of the type having a centerplate.
Figure 2:
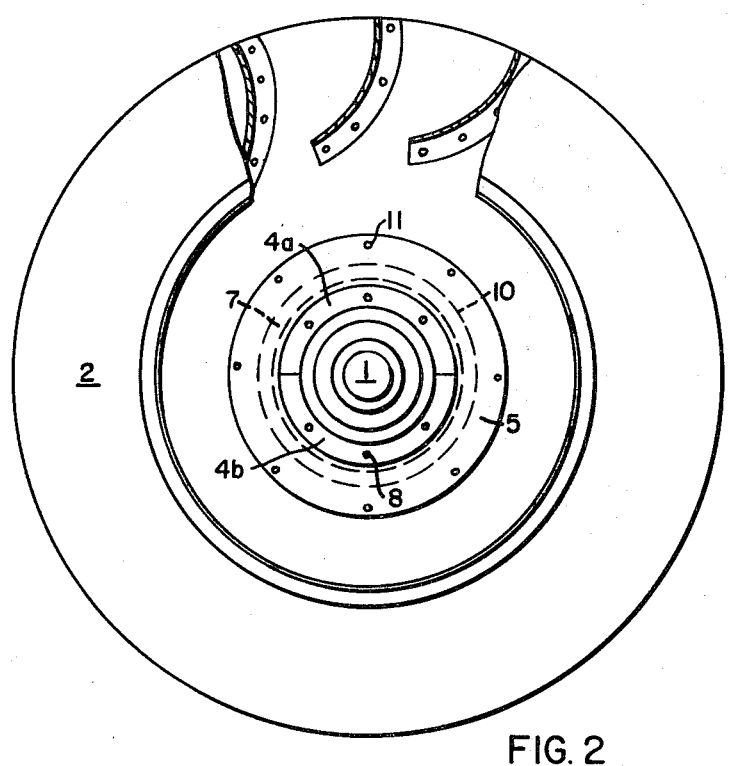
FIG. 2 is an end view as seen from the left of FIG. 1.

The details of FIGS. 1 and 2 show the apertured fan disc and hub assembly 2 which is mounted to and secured to shaft 1 such that rotary motion of shaft 1 is transmitted to the fan disc assembly 2. The invention may be practiced with apertured fan discs other than the centerplate type (e.g. endplate, sideplate, etc.), however, this type is illustrated for purposes of convenience.

The shaft 1 is provided with a circumferential recess 3 machined about its diameter. A segmental ring 4a and 4b whose inner ring dimensions are the same as the dimensions of the recess 3 is located and held temporarily within the recess 3. Accordingly, since large diameters are usually involved in an apparatus of this type, to facilitate assembly, the ring preferably is of the type having at least two parts such as 4a and 4b.

While the ring 4a, 4b is being held temporarily in the recess, a principal hub 5 is shrunk onto the periphery of the ring such that when the hub cools it engages the outer periphery of the ring and binds the ring tightly within recess 3 in mechanical contact with shaft 1. In the preferred form, hub 5 is provided with a mating flange complementary to the outer dimensions of the ring and is also further secured against further axial displacement relative to the segmental ring by bolt means 8.

The apertured fan disc 9 may then be slid along the shaft 1 to be secured to the hub 5 by any conventional means. However, the following load-bearing means has proven both suitable and desirable for assembly of this type of large structure. For a particularly strong load-bearing arrangement, a complementary hub member 6 may be placed on the shaft with the fan disc 9 secured between the hub members 5 and 6 by rivets 11 as shown.

In the preferred arrangement, an annular boss 7 is formed by welding or otherwise joining a ring or shoulder of metal to the inner periphery of centerplate 9. Both the principal hub 5 and the complementary hub member 6 have machined into their mating surfaces the annular recesses 5a and 6a which are complementary to the annular boss 7 when the hubs are assembled on the shaft. With the provision of the boss 7, the rivets 11 previously described need only be strong enough to overcome axial loads since radial centrifugal shear forces of the centerplate 9 are carried by the load bearing relationship of the recesses 5a, 6a of the hubs 5, 6 and the centerplate's boss 7.

Various modifications will occur to those skilled in the art.

I claim:

1. A fan disc and shaft assembly comprising a shaft having a circumferential recess, a fan disc having a concentric circular aperture through which said shaft extends in the assembled relation, a segmental ring positioned within said recess to prevent axial displacement of said ring relative to said shaft in the assembled relation, a principal hub member having a central aperture through which said shaft extends in the assembled relation, said hub member having means adapted to engage the outer periphery of said ring when assembled thereon, the dimensions of the periphery of said ring and the engaging means of said hub being such that a shrink-fit is formed in the assembled relation between said hub and said ring thereby securing said ring and hub to said shaft, and means for securing said disc to said hub.

2. The invention of claim 1 having a secondary hub member to be assembled on said shaft, said disc being positioned between said principal hub member and said secondary hub member and secured to both said hub members.

3. The invention of claim 2 including an annular boss formed upon the periphery of said aperture of said disc, and both said hubs being complementary to said annular boss in the assembled relation to engage and retain said boss when assembled.

4. The invention of claim 2 wherein said disc is secured to both said hub members by bolt means.

5. The invention of claim 3 wherein said disc is secured to both said hub members by bolt means.

* * * * *